United States Patent
Genduso (10) Patent No.: US 6,774,888 B1
(45) Date of Patent: Aug. 10, 2004

(54) PERSONAL DIGITAL ASSISTANT INCLUDING A KEYBOARD WHICH ALSO ACTS AS A COVER

(75) Inventor: Thomas Basilio Genduso, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/596,822

(22) Filed: Jun. 19, 2000

(51) Int. Cl.$^7$ ................................................ G09G 5/00
(52) U.S. Cl. .................. 345/168; 200/5 EA; 200/5 EB; 341/22; 341/23; 361/680; 361/626; 361/627; 400/472; 400/473
(58) Field of Search ................................. 345/168, 169; 200/5 R, 5 B, 5 EA, 5 EB, 52 R; 235/145 R, 145 A, 146; 341/21–23; 361/680–683, 724–728; 400/472, 473, 478, 492

(56) References Cited

U.S. PATENT DOCUMENTS

| | | | | |
|---|---|---|---|---|
| 3,940,758 A | * | 2/1976 | Margolin | 200/5 A |
| 4,939,514 A | * | 7/1990 | Miyazaki | 200/5 A |
| 5,187,644 A | * | 2/1993 | Crisan | 108/134 |
| 5,424,728 A | * | 6/1995 | Goldstein | 341/20 |
| 5,644,338 A | * | 7/1997 | Bowen | 345/168 |
| 5,653,543 A | * | 8/1997 | Abe | 361/680 |
| 5,712,760 A | * | 1/1998 | Coulon et al. | 345/905 |
| 5,733,056 A | * | 3/1998 | Meagher | 400/472 |
| 6,088,220 A | * | 7/2000 | Katz | 341/22 |
| 6,108,200 A | * | 8/2000 | Fullerton | 235/145 R |
| 6,111,527 A | * | 8/2000 | Susel | 341/20 |
| 6,168,331 B1 | * | 1/2001 | Vann | 400/472 |
| 6,174,097 B1 | * | 1/2001 | Daniel | 400/472 |
| 6,304,431 B1 | * | 10/2001 | Kim | 361/680 |

FOREIGN PATENT DOCUMENTS

WO    WO 00/60438    * 10/2000    ............. G06F/3/02

* cited by examiner

Primary Examiner—Henry N. Tran
(74) Attorney, Agent, or Firm—Sawyer Law Group (57) ABSTRACT

A personal digital assistant (PDA) which includes a body portion and a keyboard adapted to be coupled to the body portion. The keyboard is a standard keyboard size when in use. The keyboard is also foldable to act as a cover for the body portion. In a preferred embodiment, the keyboard attaches directly to the PDA and when not in use acts as a cover for the display of the PDA. When the keyboard is unfolded and the PDA is placed onto a flat surface, the user is able to input information using their familiar touch-typing skills with a full-size keyboard.

13 Claims, 7 Drawing Sheets

Left Wing Key Carrier   Right Wing Key Carrier

FIG. 3D

SECTION A-A

SECTION B-B

PERSONAL DIGITAL ASSISTANT INCLUDING A KEYBOARD WHICH ALSO ACTS AS A COVER

FIELD OF THE INVENTION

The present invention relates generally to portable digital assistants and more particularly to a portable digital assistant which includes a keyboard.

BACKGROUND OF THE INVENTION

Personal digital assistants (PDA) are utilized in a variety of applications. When a user wishes to record a message or create a memo using a PDA, the user currently has essentially four choices as to how the data can be physically inputted into the device.

a. Written: One letter at a time, typically in a small specifically designated area on the screen. The use of a stylus is usually required.

b. Touch screen keyboard: The screen will display some form of a keyboard. The size of the keyboard is limited by the size of the screen. Again because of this "virtual" keyboard's limited size, a stylus is typically used. Also, the virtual keyboard provides no tactile feel and can be cumbersome to use specifically when the user is required to input a multiple key operation (i.e., Ctrl-Shift-Backspace).

c. Small keyboard: Some PDA are specifically designed with a small built-in keyboard. Unfortunately, this changes the aspect ratio of the PDA (The PDA tends to be long and thin) and the keyboard tends to be small.

d. Separate external keyboard: Although this provides the user with the comfort and familiar feel of a full-size keyboard, the user loses the portability which is part of the attraction of the PDA.

The choice of the input mechanism is typically specific to the model of the PDA. Except for the external keyboard, the input method may be satisfactory for brief messages of a few words. However, if the user wishes to input a longer message, or create a memo, the first three input methodologies listed above tend to be cumbersome and slow. Paramount to the problem is that these methods do not allow a user to apply any of the traditional "touch typing" skills which most computer users today are familiar and comfortable using.

A small keyboard is available for the PDA referred to as the Da Vinci PDA which is manufactured by Royal. The keyboard is foldable, and because the keyboard folds in the middle the keys are displaced from the position of a typical QWERT keyboard. Furthermore, the keyboard serves no other purpose. The keyboard simply folds to allow it to be carried separately in a more convenient fashion. Finally, although the separate external keyboard allows the touch typing skills to be used, it lacks the portability which is inherent to the PDA. Similarly, there exist the Stowaway portable keyboard by Think Outside. Although this keyboard, when unfolded, has the standard key placement, it is not incorporated as a cover to the PDA when the keyboard is not in use nor does it incorporate the novel sliding key concept.

Accordingly, what is needed is a system and method for allowing a user to efficiently input long messages without requiring a separate keyboard. The system and method should be cost-effective, adaptable and easily implemented in existing PDAs. The present invention addresses such a need.

SUMMARY OF THE INVENTION

A personal digital assistant (PDA) which includes a body portion and a keyboard adapted to be coupled to the body portion. The keyboard is a standard keyboard size when in use. The keyboard is also foldable to act as a cover for the body portion.

In a preferred embodiment, the keyboard attaches directly to the PDA and when not in use acts as a cover for the display of the PDA. When the keyboard is unfolded and the PDA is placed onto a flat surface, the user is able to input information using their familiar touch-typing skills with a full-size keyboard.

DETAILED DESCRIPTION

The present invention relates to an improvement in portable digital assistants (PDAs). The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown, but is to be accorded the widest scope consistent with the principles and features described herein.

A system in accordance with the present invention comprises a personal digital assistant (PDA) with a detachable keyboard, which when folded acts as a cover for the PDA and when unfolded is a full size QWERT keyboard. In a preferred embodiment, the keyboard is a tri-fold design which is attached to the body portion of a PDA. A key feature in the keyboard is the sliding a slideable key row which minimizes the width of the keyboard when the keyboard is folded yet maintains the staggered key positioning of the QWERT keyboard when the keyboard is in use. The keys of the slideable key row are referred to as the "sliding keys." The sliding keys allow the sections of the keyboard to have straight smooth edges at which the sections of the keyboard are hinged. Also in a preferred embodiment, when folded the keyboard has the same width and height as the PDA to which it is attached.

Figure 1:
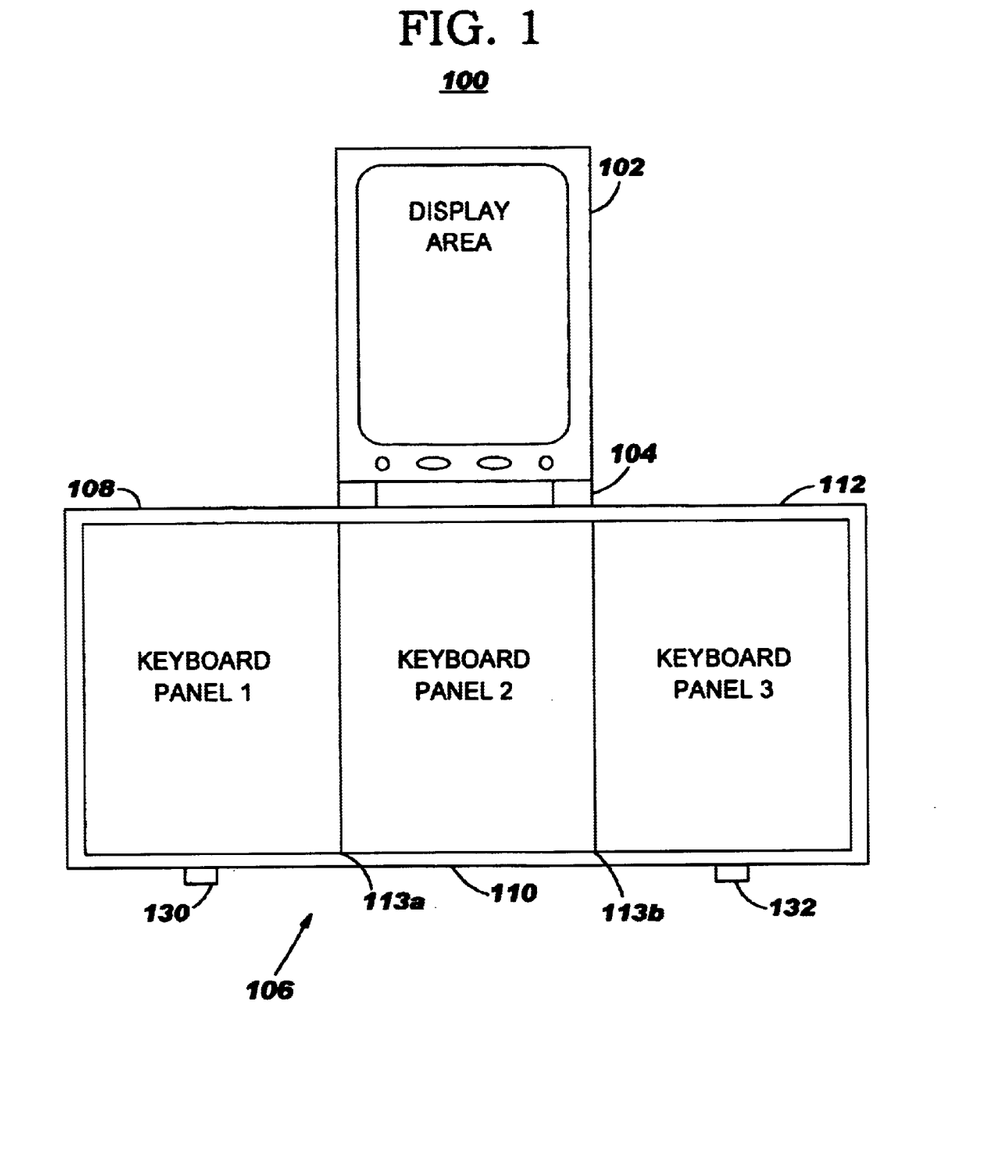
FIG. 1 illustrates a personal digital assistant (PDA) in accordance with the present invention.

To describe the present invention in more detail, refer now to the following description in conjunction with the accompanying figures. FIG. 1 illustrates a personal digital assistant (PDA) 100 in accordance with the present invention. As seen in the figure, attached to the PDA display unit 102, via a hinge 104, is a keyboard 106. The keyboard 106 includes in a preferred embodiment three sections 108, 110 and 112.

Each section 108–112 has the same height and width dimensions as the PDA display unit 102. The three sections 108–112 are hinged to each other using the hinges 113a and 113b in the figure. When unfolded as shown in the figure, the three sections 108–112 create a standard keyboard 106. The precise layout of the keys which make up the keyboard 106 will be discussed in detail below.

Figure 2:
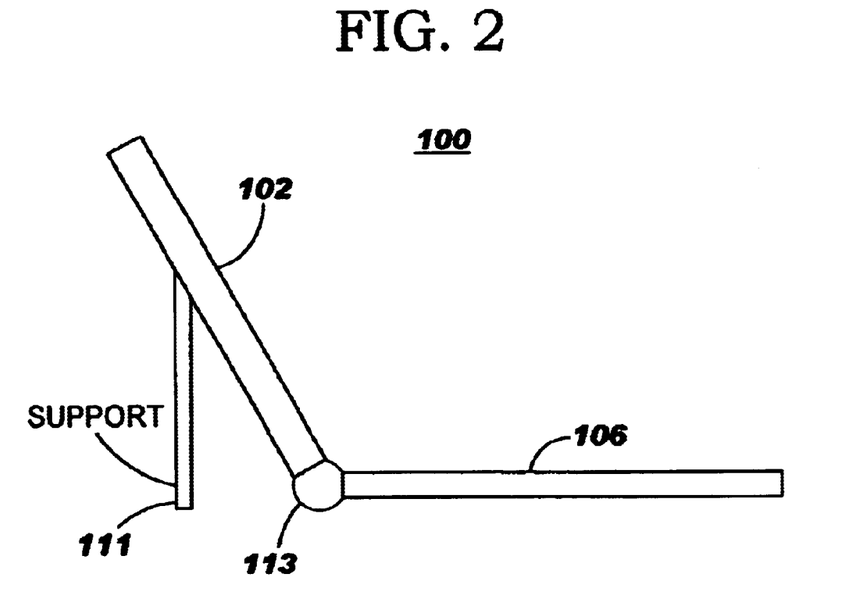
FIG. 2 illustrates a side of the PDA of FIG. 1.

FIG. 2 illustrates a side view of the PDA 100 of FIG. 1. To facilitate the use of the PDA 100 when the user is typing on the keyboard 106, the PDA 100 includes a support 111.

This support 111 is lowered and locked into position as shown in FIG. 2 and supports the PDA Display Unit 102 in a comfortable viewing angle while the keyboard 106 is in use.

Referring back to FIG. 1, a key feature of the present invention is the design of the keys on the sections 108–112 of the keyboard 106. A specific feature of keyboard 106 is the sliding "keys". This feature allows the keyboard 106 to fold into three sections 108–112 while still maintaining the staggered column key positions of a standard QWERT keyboard. The keyboard 106 utilizes the slide control arms 130, 132 to relocate certain keys of the keyboard.

Figure 3A:
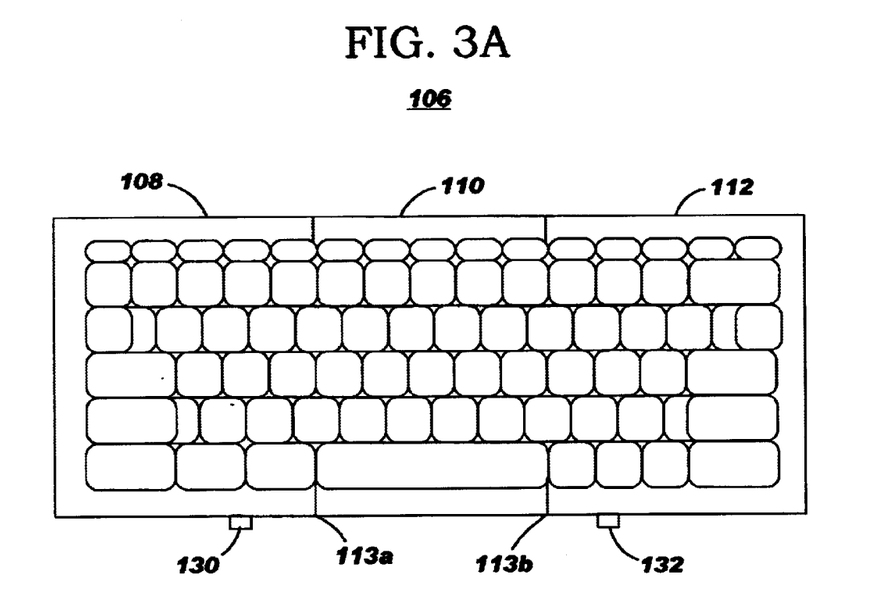
FIG. 3a illustrates the keyboard in its position when used.
Figure 3B:
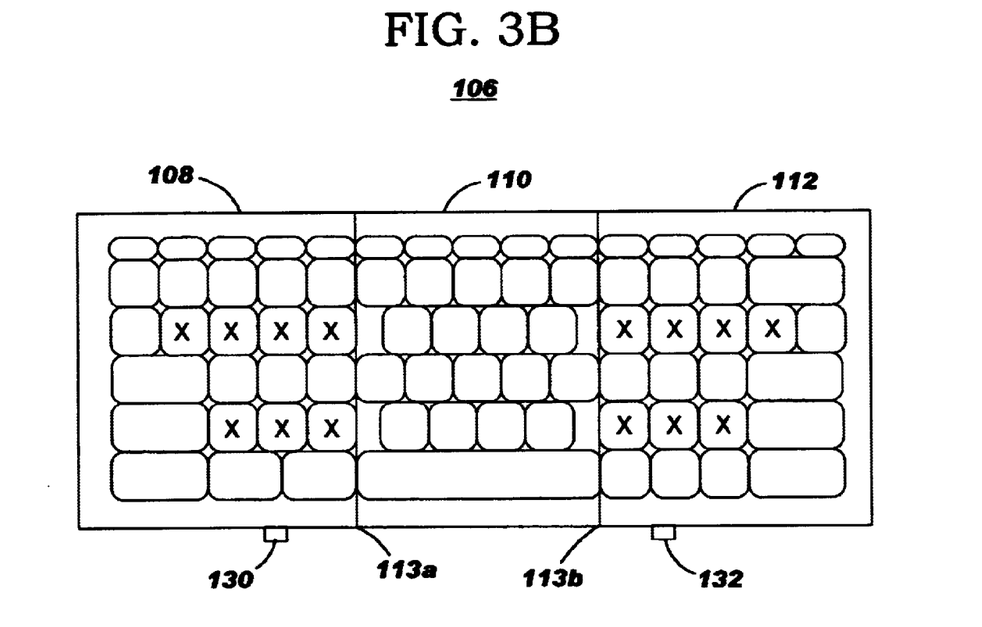
FIG. 3b illustrates the keyboard and the keys when the keyboard is prepared to be placed into its folded position.

In FIGS. 3a and 3b, two positions of the folding keyboard 106 are shown. FIG. 3a illustrates the keyboard 106 is its "in use" or locked position. In this position, the keys of the keyboard 106 are arranged as they would be when the user intends to type on the keyboard 106. When the keyboard 106 is in this position, the keys are arranged as they would be on any other typical QWERT keyboard 106. (The rows of keys are staggered one from the other).

The keyboard 106 is divided into three sections 108–112 (labelled labeled Keyboard Panel 1 108, Keyboard Panel 2 110, and Keyboard Panel 3 112 respectively). These three sections 108–112 are connected together via two hinges 113a and 113b. The left side edge of Keyboard Panel 3 112 is connected via hinge 113b to the right side edge of Keyboard Panel 2 110. The right side edge of Keyboard Panel 1 108 is connected via hinge 113a to the left side edge of Keyboard Panel 2 110. On the Keyboard Panel 1 108 and Keyboard Panel 3 112, there are slide control arms 130 and 132 which are used to position the sliding key rows on Keyboard Panel 1 108 and Keyboard Panel 3 112 respectively. (There are no sliding keys on the Keyboard Panel 2 110, therefore there is no slide control arm for this keyboard panel.)

FIG. 3b illustrates the position of the keys after the slide control arms 130 and 132 of both the Keyboard Panel 1 108 and Keyboard Panel 3 112 have been moved into their "folding" position. This illustration shows the keyboard 106 ready to be folded. The specific keys which are effected by the motion of the slide control arms 130 and 132 are highlighted by the letter "X". It is these keys, and only these keys, which actually change position when the two slide control arms 130 and 132 are moved. These keys are referred to as the "sliding keys". This illustration also shows the direction of the slide control arms 130 and 132 would have been moved in order to reposition the sliding keys from their "in use" position to their "folding" position. The slide control arms 130 and 132 operate independently of each other and must both be moved in order to allow the keyboard 106 to be completely folded. As can be seen in the figure, when the keys have been slid into their "folding" position, there are straight line edges between the three sections. It is along these two straight edges that the three sections 118–112 are hinged.

Figure 3C:
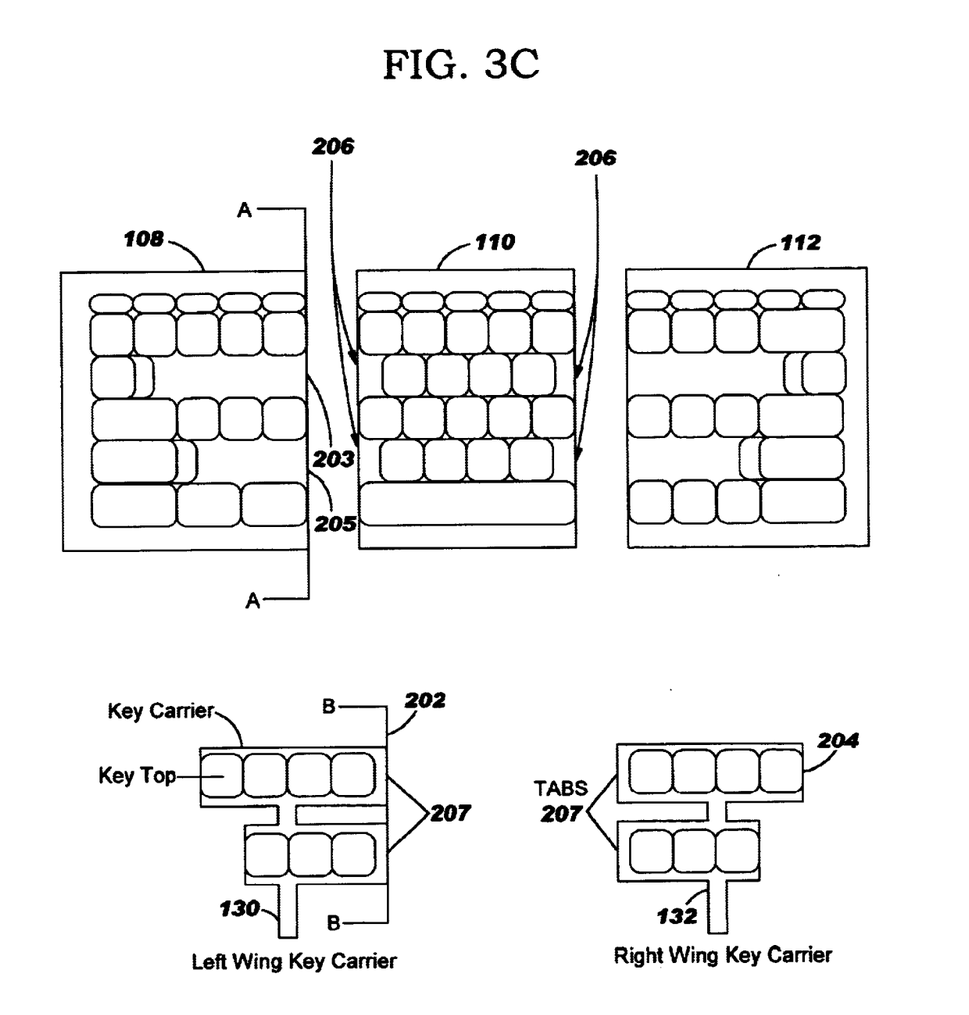
FIG. 3c illustrates a top view of the five key components which compose the folding keyboard.
Figure 3D:
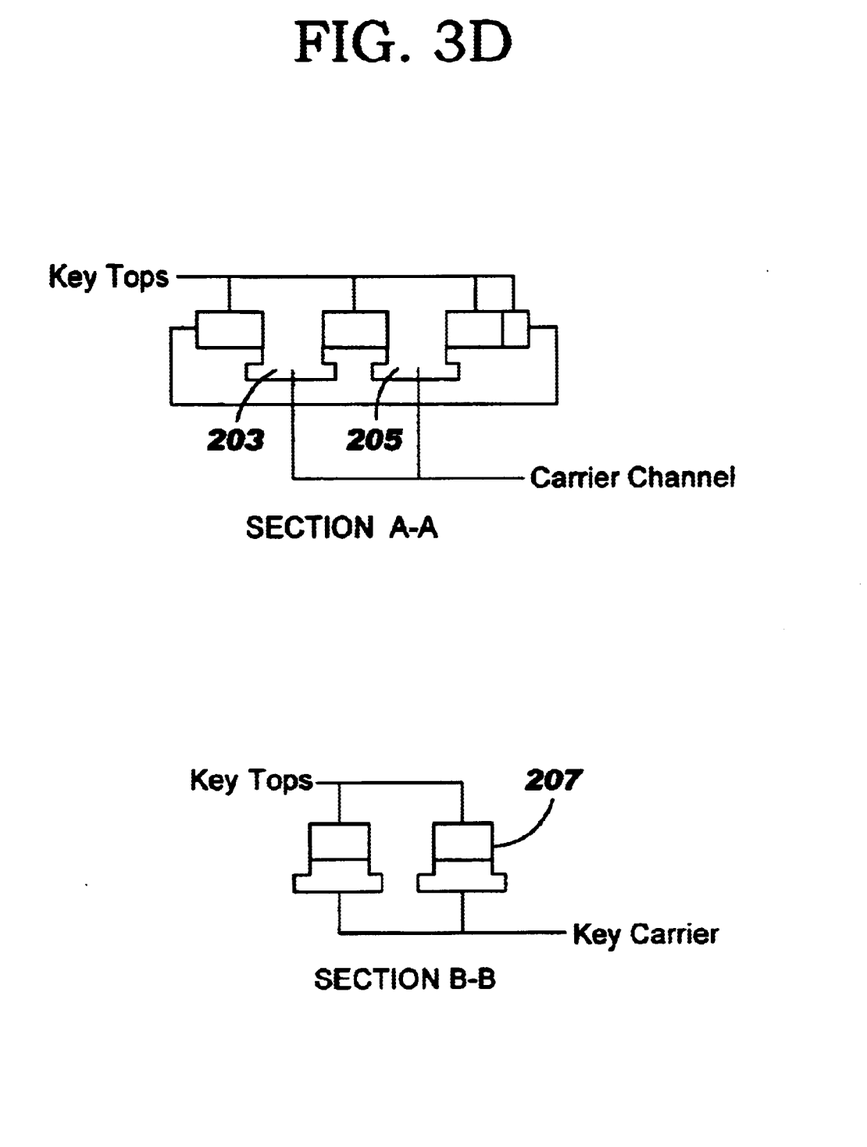
FIG. 3d illustrates a side view of two of the key components of FIG. 3c.

In FIG. 3c, the five (5) fundamental components of the folding keyboard 106 are shown. Here, the Keyboard Panel 1 108, Keyboard Panel 2 110, and Keyboard Panel 3 112 are shown with their stationary keys (stationary keys are those keys which do not slide).

Also shown in FIG. 3c, are the two key carriers 202 and 204. The key carriers 202 and 204 are the structure to which the "sliding" keys are attached. There is a key carrier 202 for the sliding keys of the Keyboard Panel 1 108 and one key carrier 204 for the sliding keys of the Keyboard Panel 3 112. (The shape of the two key carriers 202 and 204 are mirror images of each other). As shown, the slide control arm for each of the key carriers 202 and 204 is part of the key carrier structure. The key carriers 202 and 204 allowed the sliding keys of the appropriate keyboard panel to move as a single unit. A cross section of the Keyboard Panel 1 108 is shown and is labeled section A—A. In this cross-section, it can be seen that the Keyboard Panel 1 108 had two channels 203 and 205 (or slots) cut into it. It is in these channels 203 and 205 that the carrier 202 travels. When the key carrier 202 is moved, it slides in these channels 203 and 205. Similarly there is an equivalent set of channels in Keyboard Panel 3 112 in which key carrier 204 slides. The shape of the cross section of the channels are such that the bottom of the channels are wider than the top of the channels. This shape corresponds to the shape of the key carriers 202 and 204. This matching shape keeps the key carriers 202 and 204 in the channels.

When the key carriers 202 and 204 are slid into their "in use" position, the tabs 207 of the key carriers 202 and 204 slide into a set of channels 206 in the Keyboard Panel 2 110. The channels in the Keyboard Panel 2 110 have the same cross-section as the channels 203 and 205 in the Keyboard Panel 1 108 and Keyboard Panel 3 112. Sliding the tabs 207 of the key carriers 202 and 204 into the channels 206 of the Keyboard Panel 2 110 both "lock" the left and keyboard panel 1 108 and keyboard panel 3 112 into their "in use" position as well as make the electrical connection for the keyboard panel 1 108 and keyboard panel 3 112 to the Keyboard Panel 2 110. The locking action prevents the Keyboard Panel 1 108 and Keyboard Panel 3 112 from folding while the keyboard 106 is in use.

Figure 4A:
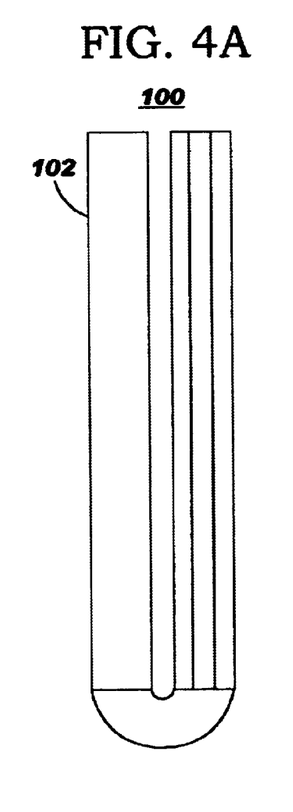
FIG. 4a illustrates a side view of the keyboard acting as a cover for the PDA.
Figure 4B:
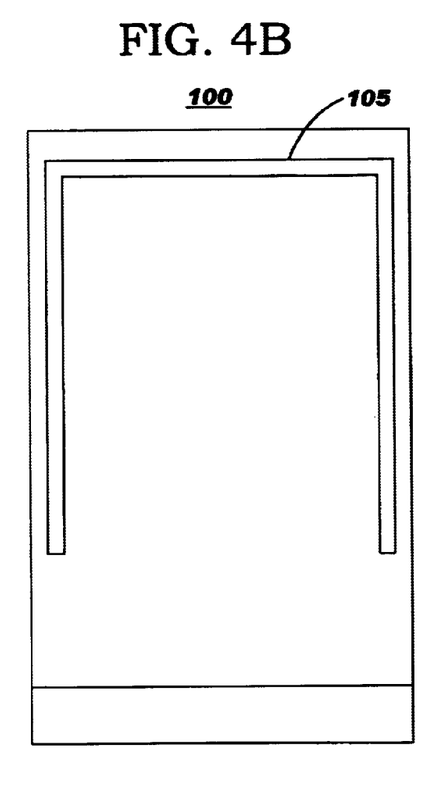
FIG. 4b illustrates a top view of the keyboard acting as a cover for the PDA.

FIGS. 4a and 4b illustrate the keyboard 106 acting as a cover for the PDA 100. FIG. 4a illustrates a side view and FIG. 4b illustrates a top view. When the user has completed with their use of the PDA 100, the keyboard 106 is then folded against the PDA 100 as shown in FIGS. 4a and 4b. The support for the PDA display unit 102 while the keyboard 106 is in use is shown in FIGS. 4a and 4b in a folded position in a groove 105 on the back of the PDA 100. It can be noted that by leaving the keys of Keyboard Panel 3 112 in the folding position, and leaving Keyboard Panel 3 112 unfolded. Keyboard Panel 3 112 can be used as a numeric keypad. This is due to the fact that the keys of Keyboard Panel 3 112, when the keys are in the folding position, are aligned as they would be on a standard numeric keypad.

Accordingly a system in accordance with the present invention comprises a personal digital assistant (PDA) with a detachable keyboard, which when folded acts as a cover for the PDA and when unfolded is a full size QWERT keyboard. In a preferred embodiment, the keyboard is a tri-fold design which is attached to a body portion of a PDA. A key feature of the keyboard are the sliding row keys which minimize the width of the keyboard when the keyboard is folded yet maintain the staggered key positioning of the QWERT keyboard when the keyboard is in use. Finally, in a preferred embodiment, when folded the keyboard has the same width and height as the body portion of the attached PDA.

Although the present invention has been described in accordance with the a embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A personal digital assistant (PDA) comprising:
   a body portion; and
   a keyboard adapted to be coupled to the body portion and being of standard keyboard size when in use, the keyboard being divided into two outer sections and a middle section, the two outer sections and the middle section having keys, wherein at least one of the outer sections includes a slide control arm and a slideable key row, wherein the slide control arm is coupled to the slideable key row, and wherein the slide control arm moves the slideable key row adjacent to the keys of the middle section, the keyboard being foldable to act as a cover for the body portion.

2. The PDA of claim 1 wherein the keyboard is in the QWERT configuration.

3. The PDA of claim 1 wherein the keyboard is foldable utilizing a plurality of slideable key rows.

4. The PDA of claim 3 wherein when the keyboard is folded the keyboard is substantially the same width and height of the body portion of the PDA.

5. The PDA of claim 4 wherein at least one of the keys on the keyboard is indented to allow the slideable key rows to slide over the at least one indented key.

6. The PDA of claim 1 wherein the body portion includes a display.

7. The PDA of claim 1 wherein a plurality of hinges are coupled between the keyboard and the body portion to allow the keyboard to act as a cover.

8. A personal digital assistant (PDA) comprising:
   a body portion; and
   a keyboard adapted to be coupled to the body portion, the keyboard being divided into two outer sections and a middle section, wherein each of the two outer sections includes a slide control arm and a slideable key row, wherein the slide control arm is coupled to the slideable key row, and wherein the slide control arm moves the slideable key row adjacent to the keys of the middle section.

9. A personal digital assistant (PDA) comprising:
   a body portion, the body portion including a display; and
   a keyboard adapted to be coupled to the body portion, the keyboard being divided into two outer sections and a middle section, wherein each of the outer sections includes a slide control arm and a slideable key row, wherein the slide control arm is coupled to the slideable key row, and wherein the slide control arm moves the slideable key row of the outer section adjacent to the keys of the middle section, the keyboard being foldable to act as a cover for the body portion.

10. The PDA of claim 9 wherein the keyboard is in the QWERT configuration.

11. The PDA of claim 9 wherein the keyboard is foldable utilizing a plurality of slideable key rows.

12. The PDA of claim 11 wherein when the keyboard is folded the keyboard is substantially the same width and height of the body portion of the PDA.

13. The PDA of claim 9 wherein a plurality of hinges are coupled between the keyboard and the body portion to allow the keyboard to act as a cover.

* * * * *